(12) United States Patent
Matsushita et al.

(10) Patent No.: US 6,632,918 B1
(45) Date of Patent: Oct. 14, 2003

(54) METHOD OF RECLAIMING CROSSLINKED RUBBER

(75) Inventors: Mitsumasa Matsushita, Aichi (JP); Makoto Mouri, Aichi (JP); Hirotaka Okamoto, Aichi (JP); Kenzo Fukumori, Aichi (JP); Norio Sato, Aichi (JP); Masahito Fukuta, Aichi (JP); Hidenobu Honda, Aichi (JP); Katsumi Nakashima, Aichi (JP); Tamotsu Watanabe, Aichi (JP); Shigeki Otsuka, Okazaki (JP); Masao Owaki, Aichi-ken (JP)

(73) Assignees: Kabushiki Kaisha Toyota Chuo Kenkyusho, Aichi-gun (JP); Toyoda Gosei Co., Ltd., Nishikasugai-gun (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/926,723

(22) PCT Filed: Jun. 7, 2000

(86) PCT No.: PCT/JP00/03713

§ 371 (c)(1),
(2), (4) Date: Mar. 22, 2002

(87) PCT Pub. No.: WO00/74914

PCT Pub. Date: Dec. 14, 2000

(30) Foreign Application Priority Data

Jun. 8, 1999 (JP) ............................. 11-161080

(51) Int. Cl.$^7$ .................................. C08F 6/00
(52) U.S. Cl. ................. 528/481; 521/41; 521/40.5; 521/45.5; 521/46.5; 521/48; 523/307; 523/343; 523/344; 523/348; 528/480

(58) Field of Search .................... 521/41, 40.5, 45.5, 521/46.5, 48; 523/343, 348, 344, 307; 528/480, 481, 502

(56) References Cited

U.S. PATENT DOCUMENTS

| 2,461,192 | A | 2/1949 | Banbury et al. |
|---|---|---|---|
| 3,856,278 | A | 12/1974 | Eisenmann |
| 3,889,889 | A | 6/1975 | Sawa |
| 5,891,926 | A | 4/1999 | Hunt et al. |
| 6,133,413 | A | 10/2000 | Mouri et al. |

FOREIGN PATENT DOCUMENTS

| EP | 0 850 738 | 7/1998 |
|---|---|---|
| EP | 0 887 372 | 12/1998 |
| EP | 0 897 783 | 2/1999 |
| EP | 0 997 252 | 5/2000 |
| JP | 5-133514 | 5/1993 |
| JP | 7-227846 | 8/1995 |
| JP | 9-227724 | 9/1997 |
| JP | 10-287765 | 10/1998 |
| JP | 10-310662 | 11/1998 |
| JP | 11-140222 | 5/1999 |

*Primary Examiner*—Terressa M. Boykin
(74) *Attorney, Agent, or Firm*—Oblon, Spivak, McClelland, Maier & Neustadt, P.C.

(57) ABSTRACT

The object of the present invention is to provide a method of reclaiming crosslinked rubber, which can reclaim various kinds of crosslinked rubbers whose reclamation is difficult.

The method of reclaiming crosslinked rubber 10 of the present invention includes a step of reclaiming crosslinked rubber by applying shear stress to the crosslinked rubber 10, wherein the maximum pressure in the reclaiming step is 1.5 MPa or more.

14 Claims, 4 Drawing Sheets

METHOD OF RECLAIMING CROSSLINKED RUBBER

TECHNICAL FIELD

The present invention relates to a method of reclaiming various kinds of crosslinked rubbers such as non-sulfur crosslinked rubber, sponge rubber, silicone rubber and diene-type rubber.

BACKGROUND ART

Heretofore, a reclaiming method wherein crosslinked rubber is converted into reclaimed rubber by applying heat and shear stress thereto has been known as a method of reutilizing wastes of rubber moldings such as tire wastes, or scrap, defective moldings etc. occurring in a process for producing rubber moldings.

According to the above reclaiming method, cross-linkages among rubber molecules constituting crosslinked rubber are cleaved by heat and shear stress, thus making the rubber molecules in a state similar to non-crosslinked molecules.

By re-crosslinking such reclaimed rubber singly or after being blended with new non-crosslinked rubber, the reclaimed rubber can form moldings.

The crosslinked rubber can thereby be recycled.

However, there are some kinds of crosslinked rubbers whose reclamation is difficult or not feasible by the prior art techniques described above.

For example, even if rubber such as non-sulfur crosslinked rubber (peroxide-crosslinked rubber) is heated and subjected to shear stress, the rubber is merely pulverized by the shear stress, resulting in little cleavage of the cross-linkages. Pulverization of rubber into fine powder is estimated to cause the rubber molecules to be hardly subjected to shear stress.

Further, when sponge rubber having a foamed phase, or a rubber blend prepared by blending such sponge rubber with normal crosslinked rubber (solid rubber), is reclaimed according to the prior art techniques, there arose the following problems.

Also, because of the gaseous components such as entrained air, the sponge rubber is poor in heat conductivity, requires longer preheating, and is slow in the progress of plasticization. Further, the sponge rubber is hardly sheared due to low bulk density, thus making the progress of plasticization slow. Accordingly, reclamation treatment thereof requires a longer time.

Further, due to entrained gaseous components, the pressure during reclamation treatment may be varied, and there may arise troubles such as pulsation, abnormal blowing or blowing back of rubber, so that stable reclamation treatment thereof was difficult.

For example, rubber such as silicone rubber or a rubber blend containing silicone rubber could not be reclaimed by the conventional method.

This is because main chains or cross-linkages of silicone rubber are stable to heat and difficult to be cleaved. Further, in an oxygen atmosphere, its molecules are recombined due to oxide deterioration.

During reclamation, a rubber blend, e.g., consisting of natural rubber and butadiene-type rubber used in automobile tires is deteriorated due to oxidation with air, thus rendering rubber molecules low-molecular by cleavage of their main chains or causing the molecules to be crosslinked with one another. Accordingly, reclamation that is excellent in qualities was difficult in the conventional method.

The present invention was made in view of these problems in the prior art, and the object of the present invention is to provide a method of reclaiming crosslinked rubber, which is capable of reclaiming various kinds of crosslinked rubbers whose reclamation is difficult.

DISCLOSURE OF INVENTION

The present invention relates to a method of reclaiming crosslinked rubber including a step of reclaiming crosslinked rubber by applying shear stress to the crosslinked rubber, wherein the maximum pressure in the reclaiming step is 1.5 MPa or more.

The most remarkable feature of the present invention is that the maximum pressure in the reclaiming step is 1.5 MPa or more.

When the maximum pressure is less than 5 MPa, crosslinked rubber may not be reclaimed.

The upper limit of the maximum pressure is preferably 100 MPa. Since a device capable of realizing the maximum pressure of higher than 100 MPa is very large-scale, realization may be difficult.

The lower limit of the maximum pressure is preferably 2 MPa, and the lower limit of the maximum pressure is more preferably 3 MPa.

By increasing the pressure in the reclaiming step as described above, rubber molecules in crosslinked rubber, whose reclamation is difficult in the conventional method because of failure in sufficiently subjecting them to shear stress, can be sufficiently subjected to shear stress, thus efficiently cleaving the cross-linkages therein to reclaim the crosslinked rubber whose reclamation is difficult.

According to the present invention as described above, a method of reclaiming crosslinked rubber can be provided, which is capable of reclaiming various kinds of crosslinked rubbers whose reclamation is difficult.

The reclaiming step in the present invention preferably includes a preheating step and a plasticizing step. In this plasticizing step, shear stress is applied while the maximum pressure is made preferably 1.5 Pa or more.

In the reclaiming method of the present invention, the temperature of crosslinked rubber to be reclaimed is increased due to evolution of heat by shear stress and/or heating from the outside. This is the preheating step.

When the crosslinked rubber attains a predetermined temperature in the preheating step and is further subjected to shear stress, cleavage of cross-linkages and/or some main chains in the crosslinked rubber is initiated, thus softening the crosslinked rubber. This is the plasticizing step.

These steps in the reclaiming method of the present invention can be independently conducted, but from the viewpoint of efficiency of production, it is preferable that the respective steps are conducted successively in one vessel. In this case, the process may proceed successively or simultaneously because the boundary between the respective steps is indefinite.

The two steps described above may be followed by a step of further applying shear stress to the softened crosslinked rubber in order to cleave cross-linkages sufficiently and to disperse and mix rubber molecules. This step is the kneading step. By this step, reclaimed rubber of uniform quality can be obtained.

In addition to the steps described above, there may be further steps such as a step of blending with other materials, a step of re-crosslinking by adding a vulcanizing agent, a step of deodorization, degasification and exhaust, and a step of denaturation and modification by adding an additive and a reacting agent.

In the reclaiming method of the present invention, the crosslinked rubber is sheared preferably at such a temperature that the cross-linkages in the crosslinked rubber are cleaved and simultaneously cleavage of main chains of rubber molecules constituting the crosslinked rubber does not extremely proceed.

As the shear stress applied is increased, cross-linkages are cleaved more easily, and thus as the shear stress is increased, the temperature during reclamation (temperature of the crosslinked rubber and/or reclaimed rubber) can be lowered.

Specifically, the reclaiming step is conducted preferably at the temperature of 100 to 520° C. When the reclaiming step is conducted at a temperature of less than 100° C., the cleavage of cross-linkages etc. may not sufficiently proceed. Also, when the temperature is higher than 520° C., cleavage of main chains may extremely proceed to deteriorate the physical properties of reclaimed rubber. The upper limit of the above temperature range is more preferably 450° C.

In the reclaiming step, the crosslinked rubber is heated or cooled as required so as to be in the above temperature range. When the heat evolved by the crosslinked rubber upon shearing is too low, the rubber is heated, and when the heat evolved is too high, the rubber is cooled down. When the above temperature range is attained by the heat evolved by the crosslinked rubber upon shearing, heat transfer (heating or cooling) from the outside is not necessary.

The optimum temperature range is varied depending on the type of the crosslinked rubber. For example, when automobile tires etc. are to be reclaimed, the temperature range is preferably 180 to 360° C. When peroxide-crosslinked rubbers such as EPDM are to be reclaimed, the temperature range is preferably 220 to 450° C.

The upper limit of the temperature range during reclamation is varied depending on the duration of reclamation, and the temperature should be raised when short.

The shear stress applied in the plasticizing step in the present invention is preferably 1 to 100 MPa. When the shear stress is less than 1 MPa, cleavage of cross-linkages cannot sufficiently proceed and the efficiency of reclamation may be lowered. When the shear stress is higher than 100 MPa, the shear stress may cause not only cleave of cross-linkages but also extreme cleavage of main chains, whereby the physical properties of the reclaimed rubber may be deteriorated.

The upper limit of the shear stress is more preferably 15 MPa.

The optimum range of the shear stress is also varied depending on the type of crosslinked rubber, and the shear stress is most preferably 1 to 5 MPa for e.g. automobile tires. When the crosslinked rubber is used peroxide-crosslinked rubber such as EPDM, the shear stress is preferably 3 to 10 MPa.

The shear stress can be calculated by multiplying the shear rate in a device used for applying shear stress by the viscosity of the crosslinked rubber.

The crosslinked rubber includes non-sulfur-type crosslinked rubber such as peroxide-crosslinked rubber.

The peroxide-crosslinked rubber is crosslinked rubber crosslinked by a peroxide-based crosslinking agent, and examples thereof include EPDM (ethylene/propylene/diene terpolymer), EPR (ethylene/propylene rubber), NBR (acrylonitrile/butadiene rubber), silicone rubber etc.

When such crosslinked rubber is subjected to shear stress for reclamation, the rubber is merely pulverized by the shear stress, resulting in little cleavage of the cross-linkages. Pulverization of rubber into fine powder is estimated to cause the rubber molecules to be hardly subjected to shear stress.

According to the present invention, such crosslinked rubber or a rubber blend containing such crosslinked rubber can be reclaimed, thus enabling recycling of more kinds of rubber products.

The present invention can also be applied to crosslinked rubbers other than those described above.

Like the conventional method, various reclaiming promoters and additives such as coloring agents, fillers and antioxidants can be added in the reclaiming method of the present invention.

The present invention further provides a method of reclaiming crosslinked rubber including a step of reclaiming crosslinked rubber by applying shear stress to the crosslinked rubber, wherein the crosslinked rubber is sponge rubber and the degree of packing in the reclaiming step is 80 vol-% or more.

The most remarkable feature of this invention is that the degree of packing in the reclaiming step is 80 vol-% or more.

If the degree of packing is less than 80 vol-%, the heat conductivity of the crosslinked rubber may be low, the progress of preheating may be slow, and the efficiency of reclamation may be lowered. Further, loading of the shear stress to the crosslinked rubber proceeding from the preheating step to the plasticizing step would be insufficient to make cleavage of cross-linkages difficult, and thus the efficiency of reclamation may be lowered and reclamation may be insufficient.

The degree of packing is more preferably 95 vol-% or more.

The reclaiming step in the present invention preferably includes a preheating step and a plasticizing step.

In this case, the degree of packing in the plasticizing step is preferably 80 vol-% or more. Further, the plasticizing step is preferably followed by a step of degasification.

The degree of packing is determined by dividing the volume of a solid part of sponge rubber (excluding constrained air) by the volume of a zone for retaining the sponge rubber in the reclaiming step (that is, the preheating step or the plasticizing step).

By raising the degree of packing in the preheating step and plasticizing step as described above, the volume of gas contained in sponge rubber having a foamed phase and in a rubber blend containing such sponge rubber is decreased, and thus the heat conductivity of such material can be increased, and the time required in the preheating step can be shortened.

By raising the degree of packing, the bulk density of sponge rubber can be increased, and the shear stress can be efficiently applied to the sponge rubber. Accordingly, the efficiency of reclamation can be increased, thus realizing shortening of the time needed for reclamation.

In the present invention, there is the step of degasification. The step of degasification is a step where gaseous components are removed from the place where the reclamation treatment is conducted.

Accordingly, a rapid fluctuation in the pressure during the reclamation treatment can be prevented, and troubles such as pulsation, abnormal blowing and blowing back of rubber can be prevented. Therefore the reclamation can be carried out safely and stably. Accordingly, the method of reclaiming crosslinked rubber can be provided, which is capable of reclaiming a wide variety of crosslinked rubbers whose reclamation is difficult.

In this reclaiming method, the maximum pressure in the plasticizing step is preferably 1.5 MPa or more as described above.

With this arrangement, the shear stress and optimum temperature necessary for reclaiming sponge rubber can be efficiently applied.

The upper limit of the maximum pressure is preferably 100 MPa. Since a device capable of realizing a pressure of higher than 100 MPa is very large-scale, realization may be difficult.

The lower limit of the maximum pressure is preferably 2 MPa. The lower limit of the maximum pressure is more preferably 3 MPa.

The sponge rubber described above includes sponge rubber having an expansion ratio of 1.5 or more and a specific gravity of 0.75 or less.

Such sponge rubber is hardly reclaimed by the conventional reclaiming method by shear stress, but effectively reclaimed according to the reclaiming method of the present invention.

For a rubber blend prepared by blending the sponge rubber with other rubber, the same effect can also be obtained.

This reclaiming method can be applied to sponge rubber such as sulfur-crosslinked (vulcanized) EPDM composed of various materials.

For the reclamation in this invention, the temperature is preferably in the range of 100 to 520° C., which is the same as in another present invention described above. The shear stress in the plasticizing step is preferably in the range of 1 to 100 MPa, which is also the same as in another present invention described above. The upper limit of the shear stress is more preferably 15 MPa.

This invention, similar to another present invention described above, also includes a preheating step and a simultaneously with a step after the plasticizing step (see Embodiment 3).

The degasifying step is performed by using e.g. an extruder provided with vent(s) arranged just over each steps such as plasticizing step and a full-flighted screw for connecting the steps such as plasticizing step.

Other features are the same as in the reclaiming method described above.

The reclaiming method is preferably conducted by use of an extruder that is pressurized by a means of suppressing the forward conveying of crosslinked rubber to an extrusion orifice of the extruder.

By suppressing the feeding of crosslinked rubber, the degree of packing of crosslinked rubber in the cylinder can be easily increased.

The feeding of crosslinked rubber in the present invention is suppressed but not stopped, so the crosslinked rubber (turning into the reclaimed rubber as the reclamation process proceeds) is sent gradually toward the extrusion orifice.

The suppressing means is preferably constituted by the screw possessed by the extruder, wherein the direction of the screw is switched at a certain position in the extruder (see FIG. 1). The feeding of crosslinked rubber can thereby be easily realized.

The extruder used is e.g. a twin-screw extruder having a cylinder with an extrusion orifice and a screw arranged in the cylinder, as shown in FIG. 1 described below.

In the case where such twin-screw extruder is used, the crosslinked rubber is introduced into the cylinder, heated in the cylinder by an external heating source, and subjected to shear stress by rotation of the screw.

The direction of the screw can be switched at a switching part in the screw as shown in FIG. 1. By rotating this screw in the cylinder, the crosslinked rubber is loaded, at the switching part, force P1 in the direction toward the extrusion orifice and force P2 in the opposite direction, so that forward conveying of the crosslinked rubber is suppressed and stopped at the switching part, thereby pressurizing the cylinder. The degree of packing of the crosslinked rubber in the cylinder can be raised by suppressing forward conveying of the crosslinked rubber and stopping the forward conveying.

The present invention also provides a method of reclaiming crosslinked rubber including a step of reclaiming crosslinked rubber by applying shear stress to the crosslinked rubber, wherein a main chain-cleaving agent is present in the reclaiming step. Crosslinked rubber such as non-sulfur-type crosslinked silicone rubber whose reclamation is difficult by the conventional reclaiming method and whose qualities are hardly influenced even if its main chains are cleaved can be reclaimed according to this method.

According to the present invention as described above, a method of reclaiming crosslinked rubber, which is capable of reclaiming various kinds of crosslinked rubbers such as silicone rubber whose reclamation is difficult, can be provided.

As the main chain-cleaving agent, a material capable of cleaving siloxane bonds is preferably used. By cleaving siloxane bonds constituting non-sulfur-type crosslinked silicone rubber, reclamation of the silicone rubber can be realized.

The material includes e.g. basic catalysts such as potassium hydroxide, polar solvents such as dimethyl formamide and dimeithyl sulfoxide, acid catalysts such as hydrochloric acid and active china clay, water, and alcohols such as ethanol, butanol and isopropyl alcohol.

It is preferable that the reclaiming step includes a preheating step and a plasticizing step, and the main chain-cleaving agent is added during the plasticizing step. With this arrangement, the main chain-cleaving agent can effectively act on the crosslinked rubber.

When the main chain-cleaving agent is added during the process, a pressure pump is preferably used. Alternatively, the main chain-cleaving agent may be allowed to be coexistent with crosslinked rubber by previously impregnating the crosslinked rubber therewith.

This reclaiming method also includes a preheating step and a plasticizing step, which is similar to another reclaiming method described above, and these steps are the same as described above.

The main chain-cleaving agent is added preferably in an amount of 0.1 to 20 parts by weight based on 100 parts by weight of the crosslinked rubber. With this arrangement, main chains in silicone rubber etc. can be certainly cleaved to realize reclamation of the crosslinked rubber. If the amount of the added main chain-cleaving agent is less than 0.1 part by weight, cleavage of main chains in the crosslinked rubber may be insufficient to make reclamation of the crosslinked rubber difficult, while if the amount exceeds 20 parts by weight, the characteristics of reclaimed rubber cannot further be improved, the ability to reclaim the rubber maybe lowered, and the material characteristics of the resulting reclaimed rubber can be deteriorated due to the presence of the non-acting main chain-cleaving agent.

The lower limit is preferably 0.5 part by weight, more preferably 5 parts by weight.

The above reclaiming step is conducted preferably at 100 to 520° C. as described above.

The present invention also provides a method of reclaiming crosslinked rubber including a step of reclaiming crosslinked rubber by applying shear stress to the crosslinked rubber, wherein the crosslinked rubber is pressurized in the reclaiming step, and the reclaiming step is conducted in a non-oxidizing atmosphere.

By using the non-oxidizing atmosphere, the reclaimed rubber can be prevented from being oxidatively deteriorated by air and oxygen gas, thus preventing re-crosslinking of the molecules during reclamation from occurring and improving the quality of the reclaimed rubber.

By pressurization, rubber molecules in crosslinked rubber, whose reclamation is difficult by the conventional method because of failure in sufficient subjection of shear stress, can be sufficiently subjected to shear stress, thus efficiently cleaving the cross-linkages therein to reclaim the crosslinked rubber whose reclamation is difficult.

The same preheating and plasticizing steps, as described above, are also preferably conducted in this reclaiming method.

As described above, the reclaiming step is conducted preferably at the temperature of 100 to 520° C.

The crosslinked rubber which is easily oxidatively deteriorated includes diene and butadiene type rubber such as SBR (styrene-butadiene rubber), NBR (acrylonitrile-butadiene rubber) and BR (butadiene rubber), as well as rubber blends including such diene or butadiene type rubber and other rubber.

The means of realizing the non-oxidizing atmosphere includes a method of replacing the air in ambient atmosphere by non-oxidizing gas when the crosslinked rubber is introduced into a reclaiming device (e.g. twin-screw extruder in FIG. 4), whereby the air is introduced together with the crosslinked rubber into the device.

As the non-oxidizing atmosphere, a nitrogen gas atmosphere etc. can be used.

The reclaimed rubber obtained in this reclaiming method can be reutilized as rubber moldings by re-crosslinking it with a crosslinking agent. Further, the reclaimed rubber can also be reutilized as rubber moldings by mixing new non-crosslinked rubber with the reclaimed rubber and re-crosslinking the resulting blend with a crosslinking agent.

The reclaimed rubber obtained in this reclaiming method is in such a state that gel components insoluble in toluene (or good solvent for the reclaimed rubber) remain in an amount of preferably 20% by weight or more, more preferably 30% by weight or more, and most preferably 40% by weight or more.

When the amount of gel components insoluble in toluene is less than 20% by weight, cleavage of not only cross-linkages but also of main chains of rubber molecules may proceed extremely. The reclaimed rubber is often sticky, and the physical properties and processability thereof may be lowered.

The amount of gel components is preferably less than 90% by weight, more preferably 80% by weight and most preferably 70% by weight. When the amount is 90% by weight or more, reclamation of the crosslinked rubber is estimated to be insufficient. Accordingly, dispersibility of the resulting reclaimed rubber in new non-crosslinked rubber and adhesion thereof may be lowered, and the surface properties and mechanical properties of rubber moldings obtained by re-crosslinking the reclaimed rubber may be deteriorated.

Although the gel components described above are varied depending on the type of reclaimed crosslinked rubber, for example, they are made of e.g. polymer gel formed by three-dimensional crosslinkage of rubber, carbon gel including rubber and carbon black, and inorganic materials such as carbon black.

The network chain density of rubber in gel components in the reclaimed rubber obtained by this reclaiming method is preferably in the range of $1/50$ to $1/4$ relative to that of the crosslinked rubber before reclamation. Such reclaimed rubber is in such a state that its rubber molecules maintain a crosslinked structure to a certain degree.

When the network chain density of rubber in the gel components exceeds $1/4$ relative to the network chain density in the crosslinked rubber before reclamation, the dispersibility thereof in new non-crosslinked rubber and compatibility thereof with the new non-crosslinked rubber may be deteriorated because of insufficient reclamation of the crosslinked rubber.

On the other hand, when the network chain density therein is less than $1/50$, cleavage of not only the cross-linkages but also of main chains of rubber molecules proceeds, thus readily making the reclaimed rubber sticky and deteriorating the physical properties and processability thereof.

The network chain density therein is more preferably in the range of $1/20$ to $1/4$ most preferably $1/20$ to $1/8$.

The Mooney viscosity (ML1+4, 100° C.) at 100° C. of the reclaimed rubber obtained in this reclaiming method is preferably 10 to 150. When the Mooney viscosity exceeds 150, the dispersibility thereof in new non-crosslinked rubber and compatibility thereof with the new non-crosslinked rubber may be deteriorated because of insufficient reclamation of the crosslinked rubber. When the Mooney viscosity is less than 10, cleavage of main chains of rubber molecules proceeds, thus readily making the reclaimed rubber sticky and deteriorating the physical properties thereof.

The Mooney viscosity is more preferably in the range of 15 to 120, most preferably in the range of 20 to 80.

BEST MODE FOR CARRYING OUT THE INVENTION

Embodiment 1

The method of reclaiming crosslinked rubber according to one embodiment of the present invention is described by reference to FIG. 1.

Briefly, the method of reclaiming crosslinked rubber in this embodiment includes a preheating step and a plasticizing step, wherein crosslinked rubber is heated and subjected to shear stress, and the maximum pressure in the plasticizing step is 1.5 MPa or more.

In this embodiment, the plasticizing step is followed by the kneading step.

In this embodiment, the following twin-screw extruder is used for reclamation of crosslinked rubber.

Figure 1:
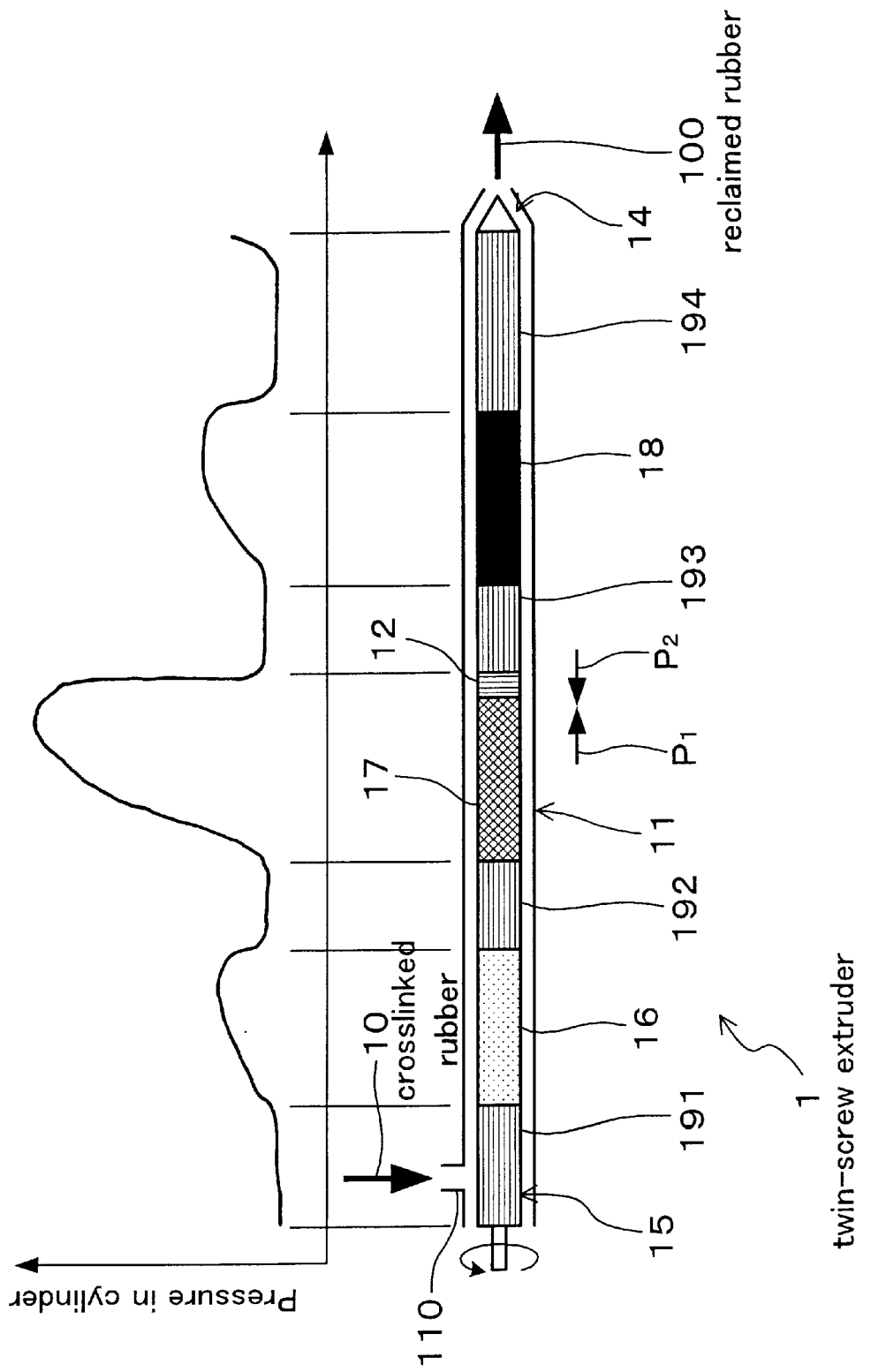
FIG. 1 is a drawing showing a twin-screw extruder and the distribution of pressure in the cylinder in Embodiment 1.
Figure 2:
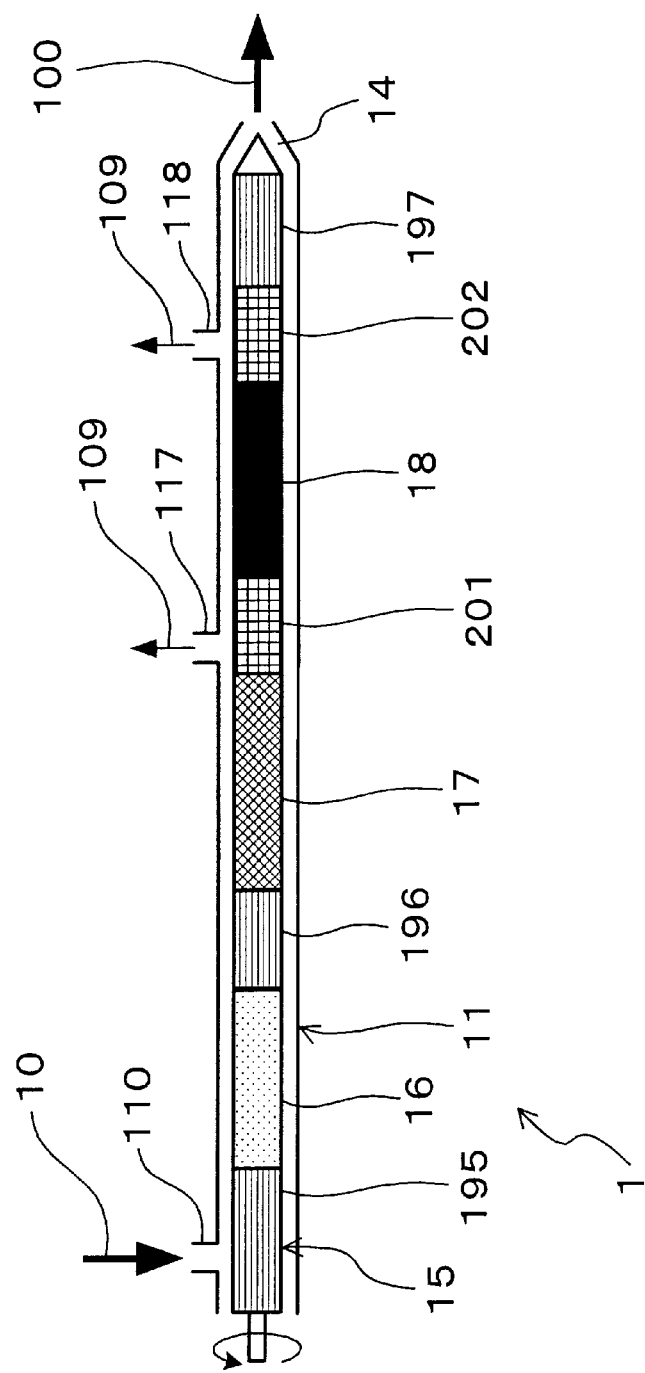
FIG. 2 is a drawing showing a twin-screw extruder provided with 2 degasification vents in Embodiment 2.

As shown in FIG. 1, the twin-screw extruder 1 is provided with a cylinder 11 having a screw 15 therein, an inlet 110 for introducing crosslinked rubber 10 into the cylinder 11, and an extrusion orifice 14 for extruding reclaimed rubber 100.

The screw 15 is provided therein with a switching part 12 at which the direction of the screw is changed (switched)

Heating is carried out by a heater, which is not shown, arranged outside of the twin-screw extruder 1, and shear stress is applied by rotation of screw 15 in the twin-screw extruder 1. By selecting the suitable screw rotation speed 15 and the screw configuration, the extent of shear stress, etc. can be regulated.

The switching part 12 is arranged in the screw 15, and when the screw 15 is rotated, the pressure exerted on crosslinked rubber 10 in the cylinder 11 is distributed as shown in the diagram in FIG. 1.

The crosslinked rubber 10 receives, at the switching part 12, force P1 in the direction toward the extrusion orifice 14 and force P2 in the opposite direction, so that forward conveying of the crosslinked rubber 10 is suppressed at the switching part, thereby increasing the pressure.

Now, the reclaiming method using the twin-screw extruder 1 is described in more detail.

As shown in FIG. 1, finely crushed crosslinked rubber 10 is fed via inlet 110 into cylinder 11. The inside of the cylinder 11 is heated at a suitable temperature, and by rotation of screw 15, the fed crosslinked rubber 10 is subjected to shear stress and gradually extruded toward extrusion orifice 14. The crosslinked rubber 10 is transferred via a forward conveying zone 191 to reach a preheating zone 16 where the preheating step is performed.

The boundary among the preheating zone 16, a forward conveying zone 192 described below and a plasticizing zone 17 described below cannot always be clearly distinguished in some cases.

The crosslinked rubber 10 advances via the preheating zone 16 and reaches a next forward conveying zone 192. The temperature of the crosslinked rubber 10 is gradually increased, and when a predetermined temperature is attained, cleavage of cross-linkages in the crosslinked rubber 10 is initiated. This is a plasticizing step, and the zone indicated by number 17 in FIG. 1 serves as a plasticizing zone where the plasticizing step is performed.

At the end of the plasticizing zone 17, there is a screw switching part 12, in the vicinity of which the pressure exerted on the crosslinked rubber is rapidly increased and maximized.

The plasticized crosslinked rubber 10 passes through a next forward conveying zone 193. Then, the crosslinked rubber 10 is subjected to shear stress by which cross-linkages of the crosslinked rubber 10 are sufficiently cleaved and the rubber molecules are dispersed and mixed to form reclaimed rubber 100. This is the kneading step, and the zone indicated by number 18 in FIG. 1 serves as a kneading zone where the kneading step is performed.

Finally, the completely plasticized reclaimed rubber 100 is extruded from the extrusion orifice 14.

Next, reclaimed rubber according to this embodiment of the present reclaiming method and reclaimed rubber according to the conventional reclaiming method were prepared and examined to compare their performances.

These samples, Samples 1-1 to 1-5 and Comparative Samples C1-1 to C1-5, are reclaimed rubbers obtained respectively from the crosslinked rubbers shown in Table 1.

In the method of reclaiming each sample and comparative sample, crosslinked rubber 100 was cut into pieces of 10 mm or less on a side and fed into the twin-screw extruder 1 having a screw diameter of 30 mm and a screw length of 1200 mm as shown in FIG. 1, and then subjected to the reclaiming treatment described above.

The conditions for reclamation are shown in Table 1.

In Table 1, "Reclamation temperature" refers to the temperature of materials in the plasticizing zone 17 in FIG. 1, "Feed rate" refers to the amount of crosslinked rubber 10 fed into the cylinder 11 via the inlet 110 per hour, "Shear stress" refers to the extent of shear stress applied to the crosslinked rubber 10 during reclamation in the plasticizing zone 17, "Average pressure" refers to the average pressure in the plasticizing zone 17, and "Maximum pressure" refers to the maximum pressure in the plasticizing zone 17 in the vicinity of the switching part 12 in the screw 15.

According to Table 1, crosslinked rubbers Samples 1-1 to 1-5 could be plasticized and reclaimed in the twin-screw extruder to provide reclaimed rubbers from the extrusion orifice by the reclaiming treatment in this embodiment.

On the other hand, crosslinked rubbers Comparative Samples C1-1 to C1-5 were merely pulverized to fail to form reclaimed rubbers because the maximum pressure in the plasticizing step in the reclaiming treatment thereof was less than 1.5 MPa. The crosslinked rubber Comparative Sample C1-5 could be plasticized in the reclaiming treatment, but the resulting reclaimed rubber indicated high pressure at the orifice and was inferior in fluidity.

Reclaimed rubbers obtained from Samples 1-1 to 1-5 and Comparative Sample C1-5, as well as reclaimed-rubber moldings obtained by re-crosslinking the reclaimed rubbers, were measured for their performance.

First, Sample 1-1, Sample 1-2, Sample 1-4, Sample 1-5, and Comparative Sample C1-5 were measured for their gel fraction and degree of swelling with toluene; Sample 1-1, Sample 1-4, Sample 1-5 and Comparative Sample C1-5 were examined for their network chain density; Samples 1-1 to 1-5 and Comparative Sample C1-5 were measured for their Mooney viscosity. The gel fraction and the degree of swelling with toluene are the index of reclaimed conditions. The Mooney viscosity is the index of the fluidity and processability of reclaimed rubber. By examining whether these values are in a certain range, it can be confirmed whether reclamation of crosslinked rubber proceeds sufficiently to provide reclaimed rubber excellent in processability.

Now, the method of measuring the gel fraction and the degree of swelling with toluene described above is explained.

0.1 g test piece of reclaimed rubber (referred to piece A) was accurately measured and then swollen by dipping it in 100-fold excess amount of toluene for 72 hours.

Then, the completely swollen test piece of reclaimed rubber (referred to as piece B) was removed, and after the extra toluene on the surface was wiped off, piece B was placed in a sealed vessel and measured for its weight. Then, the swollen test piece of reclaimed rubber (piece B) was removed from the vessel and dried in vacuum for 12 hours to remove toluene therefrom. This resultant dried test piece (referred to as piece C) was measured for its weight.

On the basis of these measured weights, its gel fraction and degree of swelling with toluene were determined as follows:

(Gel fraction)=(weight of piece C)/(weight of piece A).

(Degree of swelling with toluene)=(weight of piece B)/(weight of piece C).

Prior to this calculation, correction was made by subtracting the oil contained of the test piece from the weight.

The network chain density in reclaimed rubber was calculated from the Flory-Rehner formula by use of the weight of the dried test piece [piece C] after being swollen and the weight of the swollen test piece [piece B]. This result is shown in the item "Network chain density" expressed as a relative concentration to that of the crosslinked rubber before reclamation.

Then, the Mooney viscosity was measured according to JIS K-6300.

The measurement results are shown in Table 2.

As can be seen from these results, Samples 1-1, Sample 1-2, Sample 1-4 and Sample 1-5 had a gel fraction of 20% or more, and their network chain density were in the range of $1/50$ to $1/4$, thus indicating that these crosslinked rubbers were sufficiently reclaimed (Sample 1-2 was confirmed on the basis of gel fraction only), cleavage of main chains in rubber molecules did not considerably occur, and the resultant reclaimed rubbers could be utilized as reclaimed-rubber moldings by mixing them with new non-crosslinked rubber (see below).

Further, Samples 1-1 to 1-5 had a Mooney viscosity within the range of 10 to 150 and again, indicating that these crosslinked rubbers were sufficiently reclaimed and cleave of main chains in rubber molecules did not considerably occur.

In short, it was found that excellent reclaimed rubbers could be obtained according to this embodiment.

On the other hand, Comparative Sample C1-5 had a gel fraction of 20% or more, but the network chain density thereof was less than $1/50$, and the Mooney viscosity thereof was higher than 150, whereby it is indicated that the reclamation did not sufficiently proceed.

Then, each reclaimed rubber was mixed with new non-crosslinked rubber having the same composition and re-crosslinked therewith by adding a crosslinking agent.

The crosslinking agent used in re-crosslinking, the amount thereof, the amount of reclaimed rubber in 100 parts by weight of a blend of new non-crosslinked rubber and the reclaimed rubber, the crosslinking conditions (temperature, time) are shown in Table 2.

Further, the resulting moldings of reclaimed rubber were measured for tensile strength at break and tensile elongation at break according to JIS K-6251. The results are shown in Table 2.

From these measurement results, it was found that moldings of reclaimed rubber having physical properties utilizable as usual rubber products could be obtained by re-crosslinking the reclaimed rubbers prepared in this embodiment of the present reclaiming method.

It was found that in this embodiment of the present reclaiming method, the pressure in the plasticizing step is increased as shown in Table 1 thereby allowing pulverization to proceed due to heating and shear stress and enabling reclamation of peroxide-crosslinked EPDM, silicone rubber, sulfur crosslinked acrylonitrile-butadiene rubber and a rubber blend of natural rubber and styrene-butadiene rubber which are hardly reclaimed in the conventional method because of failure in sufficient subjection of shear stress.

Further, from Table 2, it was found that these crosslinked rubbers could be reclaimed and re-crosslinked to obtain reclaimed-rubber moldings having physical properties reusable as usual rubber products.

According to this embodiment described above, a method of reclaiming crosslinked rubber can be provided, which is capable of reclaiming various kinds of crosslinked rubbers whose reclamation is difficult.

TABLE 1

| | Crosslinked rubber | Screw rotation speed (rpm) | Reclamation temp. (° C.) | Feed rate (kg/hr) | Shear stress (MPa) | Maximum pressure (MPa) | Average pressure (MPa) | State | Reclaiming ability |
|---|---|---|---|---|---|---|---|---|---|
| samples | | | | | | | | | |
| 1-1 | Solid EPDM (PO crosslinkage) | 300 | 300 | 10 | 3 | 3 | 1.2 | plasticized | ○ |
| 1-2 | Silicone rubber (PO crosslinkage) | 300 | 250 | 10 | 3 | 3 | 1.2 | plasticized | ○ |
| 1-3 | Carpet backing wastes (NBR, S crosslinkage) | 500 | 230 | 10 | 5 | 7 | 2.8 | plasticized | ○ |
| 1-4 | Automobile tire wastes (NR/SBR = 3/7, S crosslinkage) | 400 | 220 | 10 | 4 | 5 | 2.0 | plasticized | ○ |
| 1-5 | Solid EPDM (PO crosslinkage) | 300 | 300 | 10 | 3 | 2 | 1.0 | plasticized | ○ |
| Comparative samples | | | | | | | | | |
| C1-1 | Solid EPDM (PO crosslinkage) | 300 | 300 | 10 | 3 | 0.3 | 0.1 | pulverized | x |
| C1-2 | Silicone rubber (PO crosslinkage) | 300 | 250 | 10 | 3 | 0.3 | 0.1 | pulverized | x |
| C1-3 | Carpet backing wastes (NBR, S crosslinkage) | 500 | 230 | 10 | 5 | 0.5 | 0.2 | pulverized | x |
| C1-4 | Automobile tire wastes (NR/SBR = 3/7, S crosslinkage) | 400 | 220 | 10 | 4 | 0.4 | 0.15 | pulverized | x |
| C1-5 | Solid EPDM (PO crosslinkage) | 300 | 300 | 10 | 3 | 1.3 | 0.6 | plasticized* | Δ |

PO crosslinkage: peroxide crosslinkage
S crosslinkage: sulfur crosslinkage
NBR: acrylonitrile-butadiene rubber
SBR: styrene-butadiene rubber
NR/SBR = 3/7: A rubber blend consisting of natural rubber and styrene-butadiene rubber in a ratio of 3:7 by weight
Sample 1-5, Comparative Sample C1-5: The return force of the screw used for Sample 1-1 was changed.
*)This sample showed high pressure at the orifice, indicating inferior fluidity.

TABLE 2

| | Crosslinked rubber | Gel fraction (%) | Degree of swelling with toluene (fold) | Network chain density | Mooney viscosity (ML1 + 4, 100° C.) | Crosslinking agent and amount thereof(*) (parts by weight) | Amount of reclaimed rubber added(*) (parts by weight) | Crosslinking conditions | Tensile strength at break (MPa) | Tensile elongation at break (%) |
|---|---|---|---|---|---|---|---|---|---|---|
| samples | | | | | | | | | | |
| 1-1 | Solid EPDM (PO crosslinkage) | 56.4 | 7.78 | 1/20 | 58 | Dicumyl peroxide/4.0 | 50 | 160° C., 30 minutes | 15 | 350 |
| 1-2 | Silicone rubber (PO crosslinkage) | 35.6 | 6.53 | not measured | 35 | RC-4 = 2,5-dimethyl-2,5-di (tert-butyl peroxy) hexane/0.5 | 30 | 170° C., 15 minutes + 200° C., 4 hours | 8.6 | 430 |
| 1-3 | Carpet baking wastes (NBR, S crosslinkage) | not measured | not measured | not measured | 48 | Sulfur/3, zinc oxide/5.0, stearic acid/1.0, DM/1.5, TS/0.4 | 20 | 153° C., 40 minutes | 16.5 | 300 |
| 1-4 | Automobile tire wastes (NR/SBR = 3/7, S crosslinkage) | 62.5 | 4.51 | 1/8 | 42 | Sulfur/3, zinc oxide/5, stearic acid/1, CBS/1 | 20 | 141° C., 20 minutes | 15.8 | 320 |
| 1-5 | Solid EPDM (PO crosslinkage) | 61.5 | 7 | 1/15 | 85 | Dicumyl peroxide/4.0 | 50 | 160° C., 30 minutes | 13.2 | 250 |
| Comparative samples | | | | | | | | | | |
| C1-5 | Solid EPDM (PO crosslinkage) | 75 | 5.7 | 1/87 | 160 or more | Dicumyl peroxide/4.0 | 50 | 160° C., 30 minutes | 9.2 | 117 |

(*)Parts by weight relative to 100 parts by weight of an amount of the reclaimed rubber and new non-crosslinked rubber The crosslinking agent, the amount thereof, the mixing ratio of the reclaimed rubber to new non-crosslinked rubber, and the crosslinking conditions are identical to those of Sample 1-4 in Embodiment 1 (see Table 2). of screw 15, the fed sponge rubber 10 is subjected to shear stress, passes through a forward conveying zone 195 and is gradually extruded in the direction toward the extrusion orifice 14. The sponge rubber 10 reaches a preheating zone 16 where it is gradually heated.

In the cylinder 11, the sponge rubber 10 advances in a forward conveying zone 196, and the temperature of the sponge rubber 10 is further increased. When a predetermined temperature is attained, cleavage of cross-linkages in the sponge rubber 10 is initiated at a plasticizing zone 17.

The plasticized sponge rubber 10 further advances and is subjected to shear stress, thus sufficiently cleaving cross-linkages in the sponge rubber 10 and dispersing and mixing rubber molecules to become reclaimed rubber 100 in a kneading zone 18.

The sponge rubber 10 has a foaming phase in itself, and gaseous components contained in the foaming phase advance via the preheating zone 16, the plasticizing zone 17 and the kneading zone 18, thus leaking to the outside of the sponge rubber 10. Accordingly, the gas pressure in the cylinder 11 is increased.

The degasifying zones 201 and 202 are provided with degasification vents 117 and 118 respectively, and the screw in the degasifying step is composed of a full-flighted screw or the like (preventing the sponge rubber from being retained) thereby preventing an increase in the internal pressure, and the vent is arranged just over each of the degasifying zones. The gas 109 present in the cylinder 11 can be discharged to the outside of the cylinder 11 by natural exhaust or degasification under reduced pressure.

Finally, in a state of being fully plasticized, reclaimed rubber 100 passes through an extrusion zone 197, and is extruded from an extrusion orifice 14.

Other details are similar to those in Embodiment 1.

Now, reclamation of EPDM in a state of sponge (hereinafter referred to sponge EPDM), which is sulfur-crosslinked rubber from automobile glass run channel wastes, by this embodiment of the present reclaiming method is described.

Sponge EPDM is reclaimed by the reclaiming method described above under Treatment Condition 1 in Table 3. The items for the condition have the same meanings as described in Embodiment 1.

"Degree of packing" refers to the ratio of the volume of a solid part in sponge rubber to the volume of 100 vol-% of the cylinder 11 excluding the volume of the screw, wherein the volume of a solid part in sponge rubber was measured in a state that the twin-screw extruder 1 was stopped after the sponge rubber was subjected to stable operation of the twin-screw extruder 1 (by which the rubber was stably treated with less fluctuation in the extrusion capacity of crosslinked rubber and in the material temperature and pressure in the extruder) and top covers of retention regions (packed regions) in the preheating and plasticizing steps, which are not shown, are removed.

As a comparative example, sponge EPDM was reclaimed under Treatment Condition 2. As can be seen form Table 3, the maximum pressure and the degree of packing are lower under Treatment Condition 2 than under Treatment Condition 1.

The results of reclamation under Treatment Conditions 1 and 2 are shown in Table 3. From this table, it was found that under Treatment Condition 1, sponge EPDM could be plasticized to obtain reclaimed rubber, while under Treatment Condition 2, sponge EPDM was pulverized but not plasticized, thus failing to obtain reclaimed rubber.

From the foregoing, it was found that sulfur-crosslinked sponge EPDM, whose reclamation is difficult in the conventional method because of insufficient preheating and failure in sufficiently subjecting the rubber to shear stress, could be successfully reclaimed in this embodiment of the present invention.

It was also found that under Treatment Condition 1, the time necessary in the preheating step can be reduced to about ¼ relative to that under Treatment Condition 2. It was further found that the time necessary for reclamation is almost the same as, in reclamation of usual crosslinked rubber by applying heat and shear stress thereto.

zone 18 respectively, the cylinder 11 stabilized during reclamation, thus enabling stable reclamation almost free of troubles such as pulsation, abnormal blowing and blowing back of rubber.

It was also found that even if all degasification vents are open, the same result can be obtained.

TABLE 4

|  | Just after the preheating zone | Just after the plasticizing zone | Just after the kneading zone | State | Stable reclamation |
|---|---|---|---|---|---|
| Treatment Condition 1 | closed | closed | open | pulsated | X |
| Treatment Condition 2 | closed | open | open | not pulsated | ○ |
| Treatment Condition 3 | open | closed | closed | pulsated | X |
| Treatment Condition 4 | open | closed | open | pulsated | X |
| Treatment Condition 5 | open | open | open | not pulsated | ○ |

TABLE 3

|  | Treatment Condition 1 | Treatment Condition 2 |
|---|---|---|
| Crosslinked rubber | Sponge EPDM (sulfur crosslinkage) | |
| Screw rotation speed (rpm) | 300 | 300 |
| Reclamation temp. (° C.) | 300 | 300 |
| Feed rate (kg/hr) | 10 | 10 |
| Shear stress (MPa) | 3 | 3 |
| Maximum pressure (MPa) | 3 | 0.3 |
| Average pressure (MPa) | 1.2 | 0.1 |
| Degree of packing (vol-%) | 95 | 75 |
| State | Plasticization and capable of stable reclamation | Pulverization and incapable of stable reclamation |
| Reclaiming ability | ○ | X |

Embodiment 3

In this embodiment, sponge EPDM was reclaimed under Treatment Condition 1 by a twin-screw extruder having a structure similar to Embodiment 2.

Figure 3:
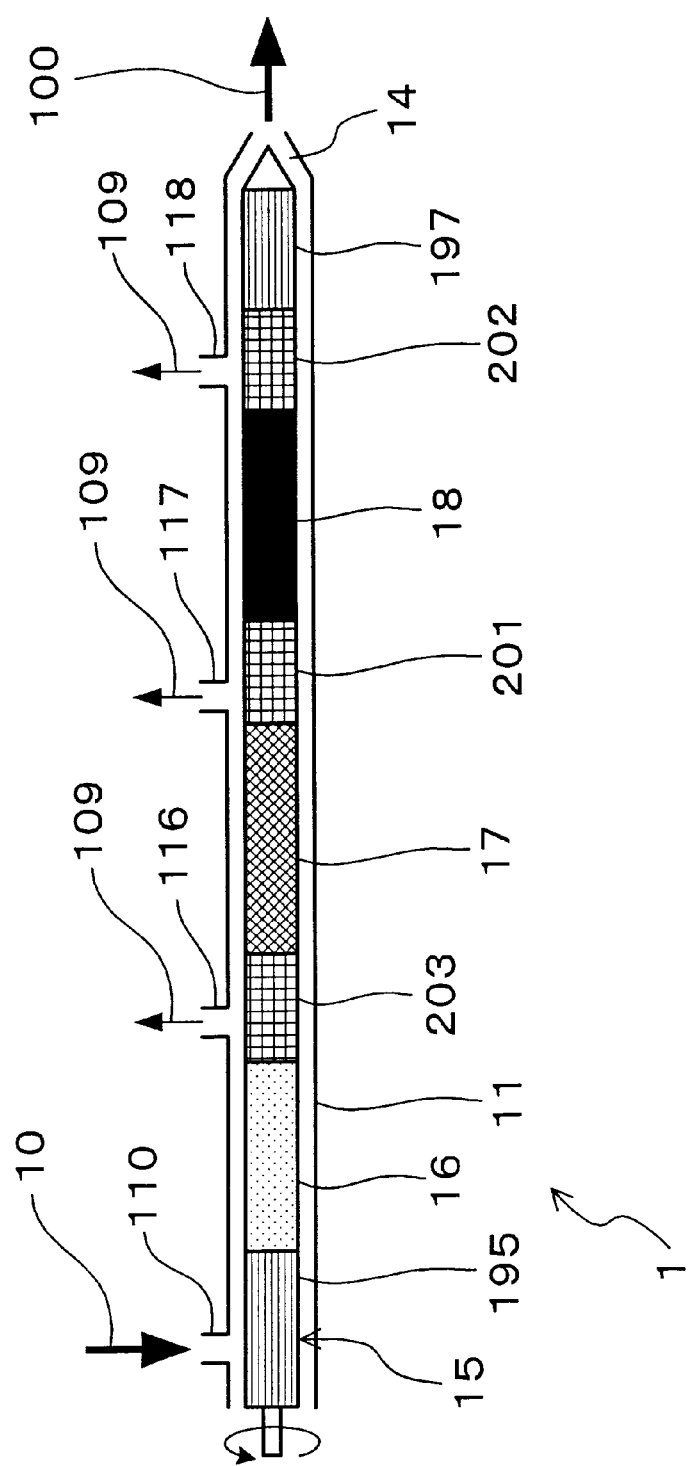
FIG. 3 is a drawing showing a twin-screw extruder provided with 3 degasification vents in Embodiment 3.

As shown in FIG. 3, the twin-screw extruder 1 used in this embodiment is provided with the degasifying zone 203 between the preheating zone 16 and the plasticizing zone 17, and the zone 203 is provided with the degasification vent 116. Because the twin-screw extruder 1 in this embodiment is provided with degasification vents 117 and 118, there are three degasification vents in total.

The sponge EPDM was reclaimed under the condition that the degasification vents 116, 117 and 118 were opened or closed as shown in Table 4.

Whether or not the rubber was stably reclaimed under each condition is shown in item, "Stable reclamation", in Table 4.

The rubber was judged to be stably reclaimed in these following cases: no pulsation occurred; no abnormal blowing of rubber occurred; fluctuations in the material temperature and pressure are small; the discharge of the material was constant; and the outward appearance of the resultant reclaimed rubber was constant.

From Table 4, it was found that when gas 109 in the cylinder 11 is removed through degasification vents arranged just after the plasticizing zone 17 and the kneading Embodiment 4

In this embodiment, reclamation of crosslinked rubber in a non-oxidizing atmosphere is described.

Figure 4:
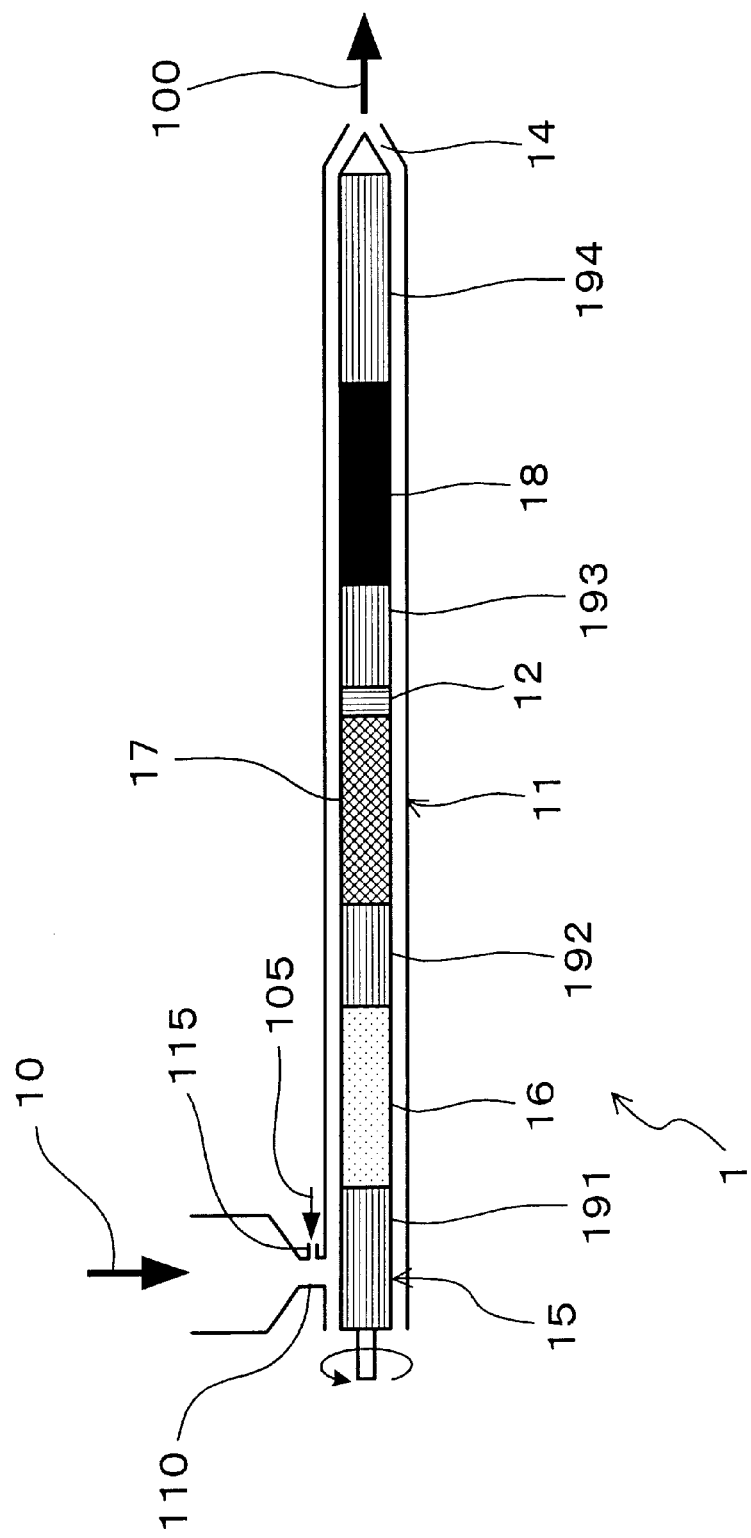
FIG. 4 is a drawing showing a twin-screw extruder provided with a gas inlet in Embodiment 3.

The twin-screw extruder 1 shown in FIG. 4 is used for reclamation in this embodiment.

The twin-screw extruder 1 includes screw 15 and cylinder 11, and the cylinder 11 is provided with an inlet 110 for feeding crosslinked rubber 10 into the cylinder 11 and an extrusion orifice 14 for extruding reclaimed rubber 100.

The inlet 110 is provided with a gas inlet 115 for introducing nitrogen gas 105, and when the crosslinked rubber 10 is introduced through the inlet 110, the atmosphere around the rubber is replaced by a nitrogen gas.

Accordingly, the crosslinked rubber 10 is introduced together with the nitrogen gas into the cylinder 11, to permit the inside of the cylinder 11 to maintain a nitrogen gas atmosphere.

Other features of the twin-screw extruder 1 are the same as in Embodiment 1, and the method of reclaiming the crosslinked rubber 10 is also the same as in Embodiment 1 except that the nitrogen gas 105 is introduced upon feed of the crosslinked rubber 10.

The crosslinked rubber 10 used was an automobile tire waste, that is, a sulfur-crosslinked rubber blend (which is the same as Sample 1-4 in Embodiment 1) including natural rubber and styrene-butadiene rubber in the ratio of 3:7 by weight, and reclamation was conducted in a different atmosphere as shown in FIG. 5. The results are also shown in Table 5. The screw rotation speed was 400 rpm, the reclamation temperature was 220° C., the feed rate was 10 kg/h, the shear stress was 4 MPa, the maximum pressure was 5 MPa, and the average pressure was 2.0 MPa.

"Standard conditions" in Table 4 indicates that the crosslinked rubber was introduced and reclaimed rubber under usual conditions in which the gas inlet 115 was closed.

"Nitrogen replacement" refers to reclamation conducted in a nitrogen gas introduced through the gas inlet 115.

"Addition of antioxidant" refers to reclamation conducted after an antioxidant having 2, 6-di-t-butyl-4-ethylphenol was mixed with the crosslinked rubber 10. 1.0 part by weight of the antioxidant was added to 100 parts by weight of the crosslinked rubber 10. "Addition of antioxidant+nitrogen replacement" refers to reclamation conducted under the two conditions described above.

From Table 5, it can be seen that by nitrogen replacement, the average molecular weight of sol is increased, and the physical characteristics of the vulcanized product of the reclaimed rubber are improved. It can also be seen that by combining nitrogen replacement with addition of the antioxidant, the physical characteristics are further improved.

The crosslinking agent, the amount thereof, the mixing ratio of the reclaimed rubber to new non-crosslinked rubber, and the crosslinking conditions are identical to those of Sample 1-4 in Embodiment 1 (see Table 2).

TABLE 5

|  | Gel fraction (wt %) | Average molecular weight of sol | Degree of swelling with toluene (fold) | Tensile strength at break (MPa) | Tensile elongation at break (%) |
| --- | --- | --- | --- | --- | --- |
| Standard conditions | 62.5 | $5.87 \times 10^4$ | 4.51 | 15.8 | 320 |
| Nitrogen replacement | 61.6 | $10.2 \times 10^4$ | 4.94 | 18.3 | 480 |
| Addition of antioxidant | 61.4 | $8.60 \times 10^4$ | 4.55 | 17.2 | 400 |
| Addition of antioxidant + nitrogen replacement | 60.4 | $11.5 \times 10^4$ | 5.13 | 19.7 | 530 |

Embodiment 5

In this embodiment, reclamation of silicone rubber is described.

Briefly, the reclaiming method in this embodiment includes applying heat and shear stress to silicone rubber, wherein a main chain-cleaving agent is added for reclamation.

Hereinafter, this reclaiming method is described in more detail.

This embodiment of the present reclaiming method is conducted by using a twin-screw extruder similar to that used in Embodiment 1. In this method, silicone rubber is fed via the inlet into the cylinder as shown in FIG. 1 described above, and by a pressure pump for injection separately arranged in the cylinder, a main chain-cleaving agent was injected into the silicone rubber in the process of plasticizing in the plasticizing zone in FIG. 1.

Other features are identical to those of Embodiment 1.

Hereinafter, reclamation with a main chain-cleaving and reclamation without it (C1-2 in Table 1) are described and compared.

First, isopropyl alcohol was used as the main chain-cleaving agent. In this embodiment of the present reclaiming method, isopropyl alcohol was used in an amount of 0.5 wt-% based on the total weight of silicone rubber. Separately, comparative reclamation was conducted without adding the main chain-cleaving agent.

The reclamation conditions are as follows: the screw rotation speed is 300 rpm, the reclamation temperature is 250° C. the feed rate is 10 kg/h, the shear stress is 3 MPa, and the maximum pressure in the plasticizing zone is 0.3 MPa.

As a result of the reclamation with the main chain-cleaving agent, silicone rubber was plasticized to obtain reclaimed rubber. The Mooney viscosity of the reclaimed rubber was 54, the degree of swelling thereof with toluene was 5.37-fold, and the gel fraction was 23.8 wt-%. In the comparative reclamation with no cleaving agent, silicone rubber was merely finely pulverized by shear stress and hardly plasticized. The gel fraction thereof was 95 wt-% or more, and the Mooney viscosity and the degree of swelling with toluene could not be measured.

30 wt-% reclaimed rubber obtained by adding the main chain-cleaving agent was mixed with 70 wt-% new non-crosslinked silicone rubber, followed by adding RC-4=2,5-dimethyl-2,5-di(tert-butylperoxy) hexane to the resultant rubber blend in the ratio of 2:100 by weight. This blend was crosslinked by heating at 170° C. for 15 minutes and then at 200° C. for 4 hours, to form a rubber molding.

When the crosslinking characteristic of the resultant rubber molding was measured by a curemeter, the value of T10/T90 (minutes) was 0.5/5.3. Further, when the performance of the rubber molding was examined, it was found that the tensile strength at break was 7.2 MPa, and the tensile elongation at break was 350%.

From the foregoing, it was found that silicone rubber can be reclaimed by adding the main chain-cleaving agent. It was also found that rubber moldings having practically usable performance can be produced from the reclaimed silicone rubber.

What is claimed is:

1. A method of reclaiming crosslinked rubber comprising a step of reclaiming crosslinked rubber by applying shear stress to the crosslinked rubber, wherein the maximum pressure in the reclaiming step is 1.5 MPa or more.

2. A method of reclaiming crosslinked rubber comprising a step of reclaiming crosslinked rubber by applying shear stress to the crosslinked rubber, wherein the crosslinked rubber is sponge rubber and the degree of packing in the reclaiming step is 80 vol-% or more.

3. The method of reclaiming crosslinked rubber according to claim 1, which is conducted by use of an extruder that is pressurized by a means of suppressing the forward conveying of crosslinked rubber to an extrusion orifice of the extruder.

4. The method of reclaiming crosslinked rubber according to claim 2, which is conducted by use of an extruder that is pressurized by a means of suppressing the forward conveying of crosslinked rubber to an extrusion orifice of the extruder.

5. The method of reclaiming crosslinked rubber according to claim 3, wherein the suppressing means is constituted by a screw possessed by the extruder, wherein the direction of the screw is switched at a certain position in the extruder.

6. The method of reclaiming crosslinked rubber according to claim 4, wherein the suppressing means is constituted by a screw possessed by the extruder, wherein the direction of the screw is switched at a certain position in the extruder.

7. The method of reclaiming crosslinked rubber according to claim 1, wherein the reclaiming step is conducted at 100 to 520° C.

8. The method of reclaiming crosslinked rubber according to claim 2, wherein the reclaiming step is conducted at 100 to 520° C.

9. A method of reclaiming crosslinked rubber comprising a step of reclaiming crosslinked rubber by applying shear stress to the crosslinked rubber, wherein a main chain-cleaving agent is present in the reclaiming step.

10. The method of reclaiming crosslinked rubber according to claim 9, wherein the reclaiming step comprises a preheating step and a plasticizing step, and the main chain-cleaving agent is added during the plasticizing step.

11. The method of reclaiming crosslinked rubber according to claim 9, wherein the main chain-cleaving agent is added in an amount of 0.1 to 20 parts by weight based on 100 parts by weight of the crosslinked rubber.

12. The method of reclaiming crosslinked rubber according to claim 9, wherein the reclaiming step is conducted at 100 to 520° C.

13. A method of reclaiming crosslinked rubber comprising a step of reclaiming crosslinked rubber by applying shear stress to the crosslinked rubber, wherein the crosslinked rubber is pressurized in the reclaiming step, and the reclaiming step is conducted in a non-oxidizing atmosphere.

14. The method of reclaiming crosslinked rubber according to claim 13, wherein the reclaiming step is conducted at 100 to 520° C.

* * * * *